United States Patent
Baumstein et al.

(10) Patent No.: US 10,338,244 B2
(45) Date of Patent: Jul. 2, 2019

(54) FWI WITH AREAL AND POINT SOURCES

(71) Applicants: Anatoly I Baumstein, Houston, TX (US); Di Yang, Spring, TX (US); Tetyana Vdovina, Spring, TX (US); Yaxun Tang, Spring, TX (US)

(72) Inventors: Anatoly I Baumstein, Houston, TX (US); Di Yang, Spring, TX (US); Tetyana Vdovina, Spring, TX (US); Yaxun Tang, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 93 days.

(21) Appl. No.: 15/477,417

(22) Filed: Apr. 3, 2017

(65) Prior Publication Data
US 2017/0307770 A1 Oct. 26, 2017

Related U.S. Application Data

(60) Provisional application No. 62/327,752, filed on Apr. 26, 2016.

(51) Int. Cl.
*G06F 11/30* (2006.01)
*G01V 1/28* (2006.01)
*G01V 1/30* (2006.01)

(52) U.S. Cl.
CPC .............. *G01V 1/282* (2013.01); *G01V 1/303* (2013.01); *G01V 2210/614* (2013.01); *G01V 2210/6222* (2013.01); *G01V 2210/66* (2013.01); *G01V 2210/679* (2013.01)

(58) Field of Classification Search
CPC ....................................................... G01V 1/282
See application file for complete search history.

(56) References Cited

U.S. PATENT DOCUMENTS

2015/0012221 A1\* 1/2015 Bansal .................. G01V 1/303
702/18
2016/0061974 A1 3/2016 Bansal et al.

OTHER PUBLICATIONS

Amundsen et al.: "Wave equation processing using finite-difference propagators, Part 1: Wavefield dissection and imaging of marine multicomponent seismic data", Geophysics, vol. 79(6), 2014, pp. T287-T300.*

Amundsen, L. et al. (2014) "Wave equation processing using finite-difference propagators, Part 1: Wavefield dissection and imaging of marine multicomponent seismic data", *Geophysics* 79(6), 2014, pp. T287-T300.

(Continued)

*Primary Examiner* — Phuong Huynh
(74) *Attorney, Agent, or Firm* — ExxonMobil Upstream Research Company-Law Department

(57) ABSTRACT

A method, including performing, with a computer, up/down separation of geophysical data, which produces an approximate up-going wavefield and an approximate down-going wavefield; creating an areal source based at least in part on the down-going wavefield; and performing, with a computer, a full wavefield inversion process with the areal source, and an objective function measuring a misfit between modeled up-going wavefields and recorded up-going wavefields, wherein the full wavefield inversion process generates a final subsurface physical property model.

15 Claims, 6 Drawing Sheets

(56) References Cited

OTHER PUBLICATIONS

Tu, N. et al., (2015) "Fast Imaging with surface-related multiples by sparse inversion", *Geophysical Journal International* (2015) 201, pp. 1-32.
Zhang, D., et al, (2013) "Multiples Waveform inversion", 75th EAGE Annual Meeting, 2013; 2 pages.
Amundsen, L. et al. (2014) "Prediction of wavefields by injecting multicomponent seismic measurements into modeling" SEG Annual Meeting, Oct. 26-31, Denver, Colorado; pp. 1842-1847.

* cited by examiner

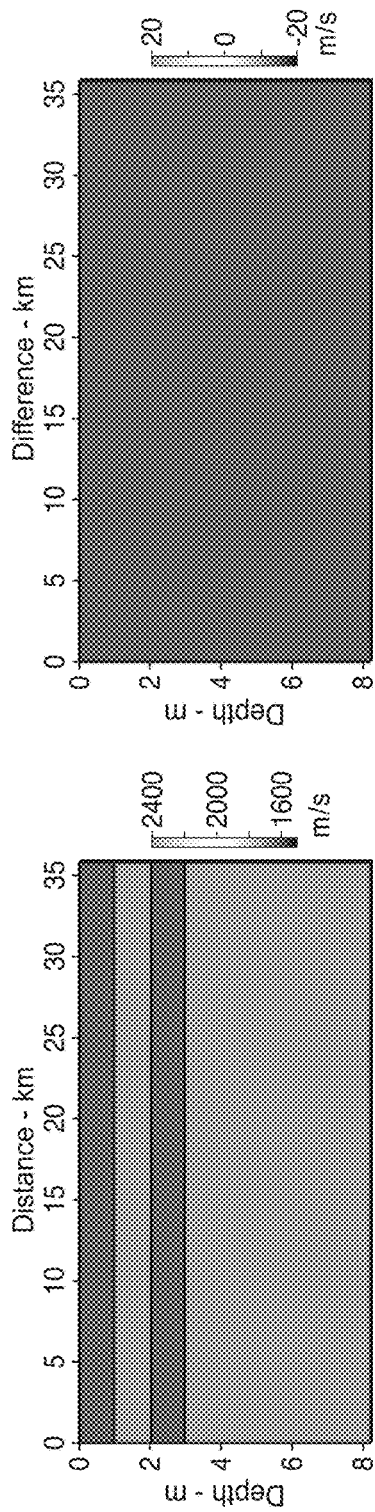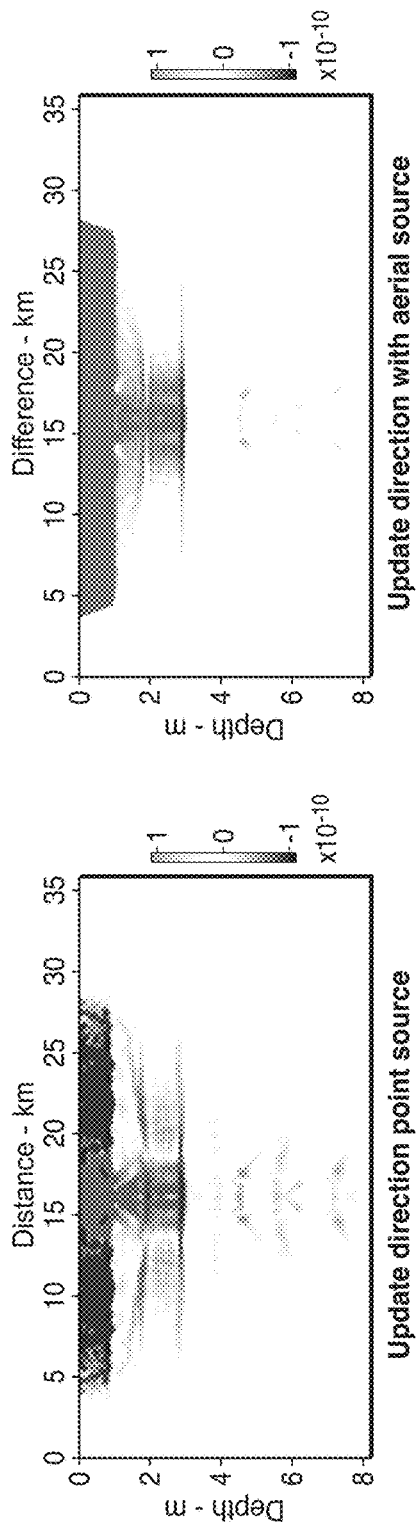

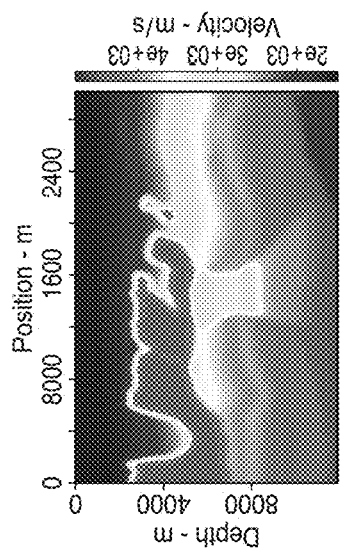
FIG. 6A
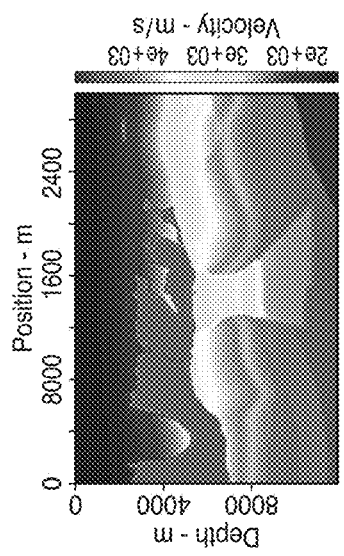
FIG. 6B
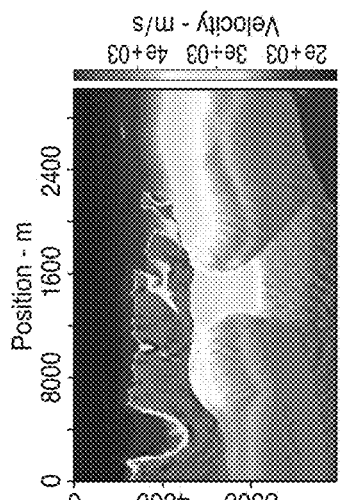
FIG. 7A
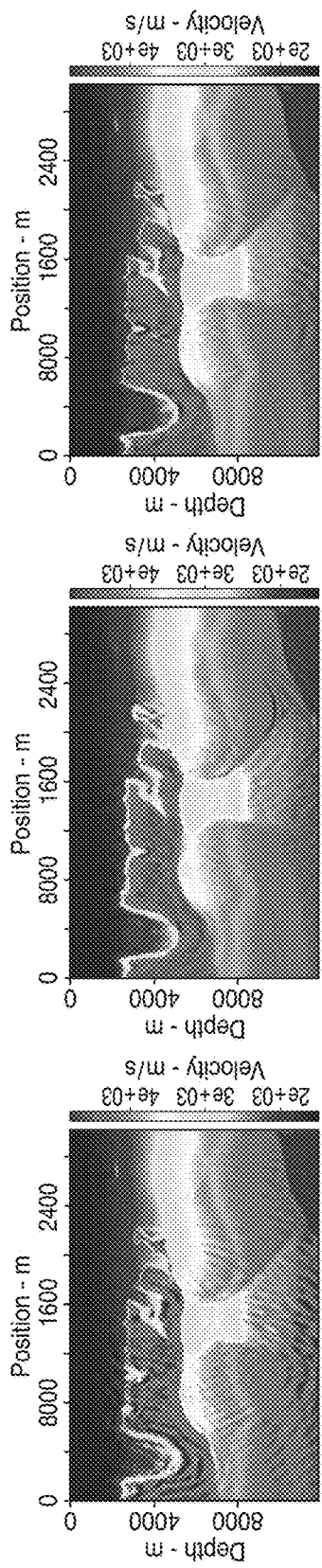
FIG. 7B
FIG. 7C

FWI WITH AREAL AND POINT SOURCES

CROSS-REFERENCE TO RELATED APPLICATION

This application claims the benefit of U.S. Provisional Patent Application 62/327,752 filed Apr. 26, 2016 entitled FWI WITH AREAL AND POINT SOURCES, the entirety of which is incorporated by reference herein.

FIELD OF THE INVENTION

Exemplary embodiments described herein pertain generally to the field of geophysical prospecting, and more particularly to geophysical data processing. Exemplary embodiments can infer properties of the subsurface based on information contained in geophysical data acquired in field experiments.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Seismic inversion is a process of extracting information about the subsurface from data measured at the surface of the Earth during a seismic acquisition survey. In a typical seismic survey, seismic waves are generated by a source 101 positioned at a desired location. As the source generated waves propagate through the subsurface, some of the energy reflects from subsurface interfaces 105, 107, and 109 and travels back to the surface 111, where it is recorded by the receivers 103. The seismic waves 113 and 115 that have been reflected in the subsurface only once before reaching the recording devices are called primary reflections. In contrast, multiple reflections 117 are the seismic waves that have reflected multiple times along their travel path back to the surface (dashed lines in FIG. 1). Surface-related multiple reflections are the waves that have reflected multiple times and incorporate the surface of the Earth or the water surface (more generally, this is an interface with air, which may be a water-air interface in the case of marine data or land-air interface in the case of land data) in their travel path before being recorded.

During seismic, electromagnetic, or a similar survey of a subterranean region, geophysical data are acquired typically by positioning a source at a chosen shot location, and measuring seismic, electromagnetic, or another type of back-scattered energy generated by the source using receivers placed at selected locations. The measured reflections are referred to as a single "shot record". Many shot records are measured during a survey by moving the source and receivers to different locations and repeating the aforementioned process. The survey can then be used to perform Inversion, e.g., Full Waveform/Wavefield Inversion (FWI) in the case of seismic data, which uses information contained in the shot records to determine physical properties of the subterranean region (e.g., speed of sound in the medium, density distribution, resistivity, etc. ... ). Inversion is an iterative process, each iteration comprising the steps of forward modeling to create simulated (model) data and objective function computation to measure the similarity between simulated and field data. Physical properties of the subsurface are adjusted at each iteration to ensure progressively better agreement between simulated and field data.

FWI is a seismic method capable of utilizing the full seismic record, including the seismic events that are treated as "noise" by standard inversion algorithms. The goal of FWI is to build a realistic subsurface model by minimizing the misfit between the recorded seismic data and synthetic (or modeled) data obtained via numerical simulation.

FWI is a computer-implemented geophysical method that is used to invert for subsurface properties such as velocity or acoustic impedance. The crux of any FWI algorithm can be described as follows: using a starting subsurface physical property model, synthetic seismic data are generated, i.e. modeled or simulated, by solving the wave equation using a numerical scheme (e.g., finite-difference, finite-element etc.). The term velocity model or physical property model as used herein refers to an array of numbers, typically a 3-D array, where each number, which may be called a model parameter, is a value of velocity or another physical property in a cell, where a subsurface region has been conceptually divided into discrete cells for computational purposes. The synthetic seismic data are compared with the field seismic data and using the difference between the two, an error or objective function is calculated. Using the objective function, a modified subsurface model is generated which is used to simulate a new set of synthetic seismic data. This new set of synthetic seismic data is compared with the field data to generate a new objective function. This process is repeated until the objective function is satisfactorily minimized and the final subsurface model is generated. A global or local optimization method is used to minimize the objective function and to update the subsurface model.

Because of the strong nonlinearity inherent in the FWI method, the results often depend on the quality of the starting velocity model. Choosing a poor starting model leads to the well-known phenomenon of "cycle-skipping" (when the traveltime difference between events simulated numerically in the computer and those acquired in the field exceeds half the period corresponding to the dominant frequency of the data) and results in the optimization process converging to an undesirable local minimum. A significant contributing factor is the accumulation of error as events are simulated using an inaccurate model of the subsurface. This error is especially large for the so-called multiple reflections, which travel down to the subsurface and then back to the acquisition surface, where they get reflected down and repeatedly propagate through the subsurface region, being recorded each time they reach the surface where receivers are located. As an example, if due to model inaccuracies a primary event was simulated with a traveltime error of $\Delta t$, then the corresponding first-order multiple would be simulated with an error of $2\Delta t$, the second-order multiple would have an error of $3\Delta t$, etc. ...

Unfortunately, correct modeling of multiples is challenging because even small inaccuracies in the background velocity model or mispositioning of the multiple-generating horizons can lead to significant accumulation of traveltime errors as multiples repeatedly traverse the subsurface.

Ideally, one would like to turn this sensitivity of multiples to the inaccuracy of the model into an advantage by converting the traveltime and amplitude errors into a source of information about the subsurface to be used in FWI.

One way to overcome the issue of error accumulation is to model multiples differently. Instead of performing numerical simulation using a point source and a free surface boundary condition, one can inject recorded field data traces as sources at receiver locations (Amundsen and Robertsson, 2014) and let the resulting wavefield propagate through the subsurface one more time. This spatially distributed source derived from field data will be called "areal" source hereafter. If an absorbing boundary condition is used instead of the free surface one and the direct arrival (from the source to receivers) is muted out, then primaries in the recorded field data will be converted into first-order multiples, first-order multiples will be converted into second-order multiples, etc. . . . Also note that, if the direct arrival is not muted out, it will be converted into primaries (perhaps with a phase error, depending on implementation).

Because field data does not have any numerical traveltime errors embedded in it and is propagated through the subsurface just once thanks to the absorbing boundary condition, no accumulation of errors occurs and, using the notation introduced in the first paragraph above, the traveltime error for all orders of multiples will be bounded by Δt. This approach is well-known and has been used most recently in the FWI context by Zhang et al. (2013), although they did not point out this particular advantage of the method. Moreover, their proposed inversion method required extracting multiples from the field data (e.g., using SRME) so that FWI could be performed by comparing modeled multiples with those extracted from the field data.

A better approach would be to avoid the need to estimate multiples separately and perform FWI by using all recorded events, both primaries and multiples. This, in turn, necessitates modeling primaries and multiples at the same time. In a recent publication, Tu and Herrmann (2014) proposed injecting a point source at the physical source location together with an areal source (and an absorbing boundary condition) to model primaries and multiples at the same time for the purposes of imaging (also known as migration or linearized inversion). They propagate the two source functions through a smooth medium, as is common in imaging, and then correlate the resulting wavefield with the back-propagated data in order to obtain the subsurface reflectivity. As their paper points out, a disadvantage of this approach is the generation of "cross-talk" when multiples of different orders happen to correlate with each other, thus producing "fake" undesirable events.

SUMMARY

A method, including: performing, with a computer, up/down separation of geophysical data, which produces an approximate up-going wavefield and an approximate down-going wavefield; creating an areal source based at least in part on the down-going wavefield; and performing, with a computer, a full wavefield inversion process with the areal source, and an objective function measuring a misfit between modeled up-going wavefields and recorded up-going wavefields, wherein the full wavefield inversion process generates a final subsurface physical property model for hydrocarbon exploration.

In the method, the creating the areal source can include: performing, with a computer, a first simulation using a point source injected as a monopole into a starting physical property model with at least one subsurface reflector and a free surface boundary condition imposed, wherein the performing the up/down separation is performed on data generated from the first simulation; performing, with a computer, a second simulation using the point source, but with the point source injected into the starting physical property model as a dipole with an absorbing boundary condition; performing, with a computer, a third simulation using an areal source including a down-going wavefield obtained from the up/down separation, and an absorbing boundary condition; adjusting simulated data from the third simulation and the second simulation to match their counterparts from the up/down separation; and applying an adjustment derived from the adjusting of the simulated data to the areal source and forming a hybrid source by concatenating the adjusted areal source and the point source.

In the method, the adjusting can include using a shaping filter.

In the method, the shaping filter can be spatially varying, and the method further can further include iteratively repeating a shaping process, wherein the shaping filter is iteratively changed during each subsequent iteration so that the shaping filter converges towards an identity operator.

In the method, the shaping filter can be iteratively changed during each subsequent iteration in order to progressively improve the match between the simulated data from the third simulation and the second simulation and their counterparts from the up/down separation.

In the method, the full wavefield inversion process can be a two stage process, a first stage including running full wavefield inversion using observed data as a source function to obtain an intermediate subsurface physical property model, and a second stage including running full wavefield inversion using a point source as a source function with the intermediate subsurface physical property model being inverted to create a starting model for the second stage.

The method can further include independently adjusting the areal source relative to the point source.

In the method, the performing the third simulation can include muting or subtracting a direct arrival before the areal source is injected.

In the method, the performing the wavefield inversion process can include using an absorbing boundary condition.

The method can include drilling a well based at a location determined at least in part from the final subsurface physical property model.

The method can include exploring for hydrocarbons using the final subsurface physical property model.

The method can include activating sources at or near Earth's surface or a water body surface, and recording reflected signals from the Earth's subsurface.

In the method, the areal source can be a hybrid source.

In the method, the areal source can be a non-hybrid source.

In the method, the geophysical data can be land data.

In the method, the geophysical data can be marine data.

The method can further include performing, with a computer, a fourth simulation using a model consisting of the water layer to determine a direct arrival from the areal source; and subtracting the direct arrival from a simulated wavefield generated by the third simulation.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

FIG. 3A illustrates an exemplary velocity model with alternating high and low velocity layers.

FIG. 3B illustrates a difference between a starting velocity model and the true velocity model (FIG. 3A).

FIG. 4A illustrates an exemplary updated direction using a conventional technique.

FIG. 4B illustrates an exemplary updated direction using the present technological advancement.

FIG. 6A illustrates an example of a true velocity model for a 2D synthetic example.

FIG. 6B illustrates an example of an initial velocity model for FWI.

FIG. 7A illustrates an example of conventional FWI using a point source as the source function.

FIG. 7B illustrates an example of FWI using the observed data as the source function.

FIG. 7C illustrates an example of a two-stage FWI.

DETAILED DESCRIPTION

Figure 1:
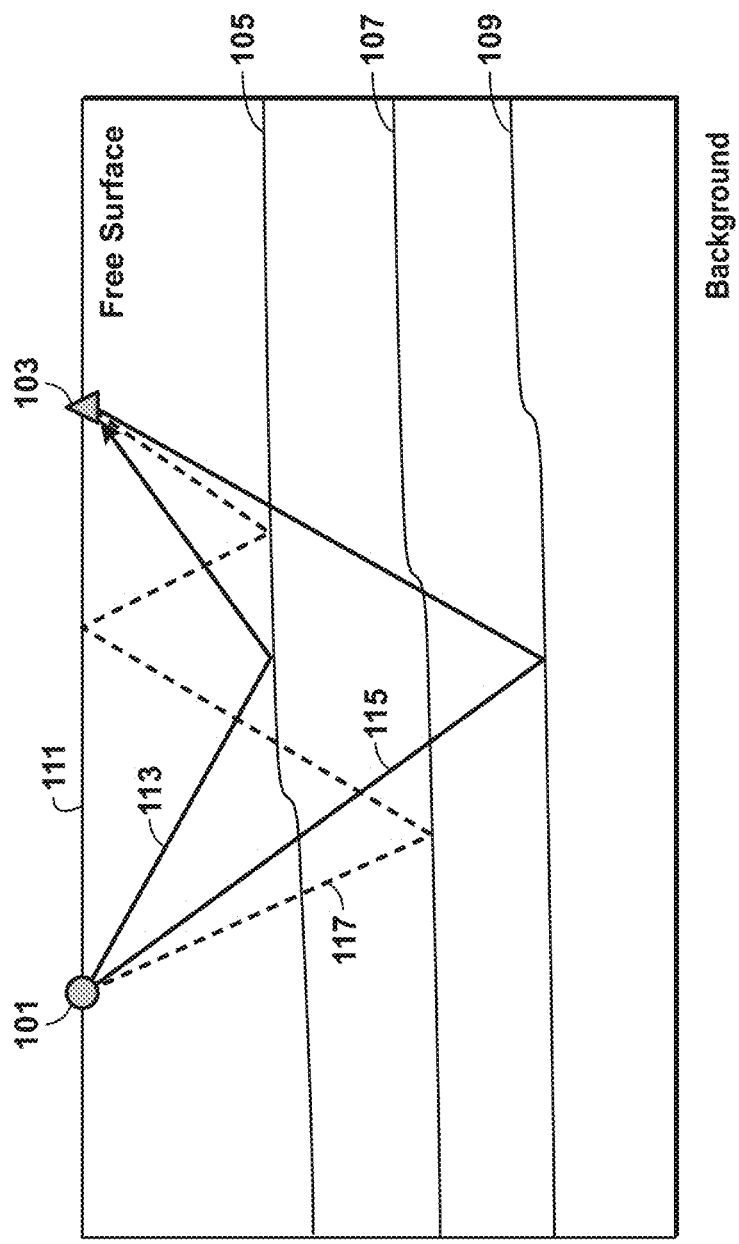
FIG. 1 is an example of primary reflections and multiple reflections.

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement can combine the simultaneous use of the point and areal sources (which we will call a hybrid source) with nonlinear inversion (FWI). The areal source is responsible for modeling multiples. The point source is responsible for modeling primaries. The advantages over previously published work include using information contained in both primaries and multiples to update the model of the subsurface and limiting the kinematic errors (thus reducing the cycle-skipping and making inversion less sensitive to the starting model). Because the areal source typically provides much wider illumination of the subsurface, it may be feasible to perform FWI using a reduced subset of shot records, thus leading to a significant speed up. Additionally, because the subsurface model is iteratively updated in the course of FWI iterations, thus leading to a gradual decrease of the residual wavefield (the mismatch between the simulated and the acquired data), the undesirable cross-talk observed by Tu and Hermann (2014) in imaging is expected to present a much smaller problem.

The present technological advancement will be described primarily in the context of Full Wavefield Inversion (FWI) of seismic data, but can be applied to inversions of other types of geophysical data.

There are various well-known ways to inject an areal source in order to simulate multiples. Equations 1-3 in Amundsen and Robertsson (2014) provide a recipe for doing this (in the case when a second-order formulation of the wave equation is used), but require the knowledge of both pressure and its vertical gradient (or, equivalently the vertical component of particle velocity) at receiver locations. If the pressure gradient is not available (as is the case in conventional single-component marine acquisition), only one of the terms (the one relying on pressure recordings only) can be used, but the resulting wavefield may have incorrect phases and amplitudes and propagate in both up- and down-going directions instead of the desired down-going direction only, necessitating mitigation steps described in the next section.

The solution of the second-order formulation of the wave equation is equivalent to the solution of the following system of first-order partial-differential equations:

$$\partial_t p(x, t) - \rho(x)c^2(x)\nabla \cdot v(x, t) = \sum_{i=1}^{n} f_i(t)\delta(x - x_i)$$

$$\rho(x)\partial_t v(x, t) - \nabla p(x, t) = \sum_{i=1}^{n} g_i(t)\delta(x - x_i),$$

where x is the vector of spatial coordinates, t is time; p is pressure; v is the vector of particle velocities; ρ is density; c is the speed of sound in the subsurface; $x_i$, $f_i(t)$, $g_i(t)$ are the spatial locations and time signatures (i.e., recorded data) of receivers; and n is the total number of elements (receivers) comprising the areal source. In this case, inserting an areal source into the first of the above equations will produce an effect similar to that of the monopole, while inserting it into the second equation will produce an effect similar to the dipole, using the terminology of Amundsen and Robertsson (2014).

Depending on the boundary conditions at the top of the model, it may be preferable to insert the areal source either as a dipole or as a monopole. In what follows, the areal and the point sources are inserted as dipoles in combination with the absorbing boundary conditions.

More general formulations of the wave equation exist (e.g., the visco-elastic wave equation) and source insertion may need to be performed differently depending on the specific form of the wave equation chosen to perform simulations.

Hybrid Source

Figure 2:
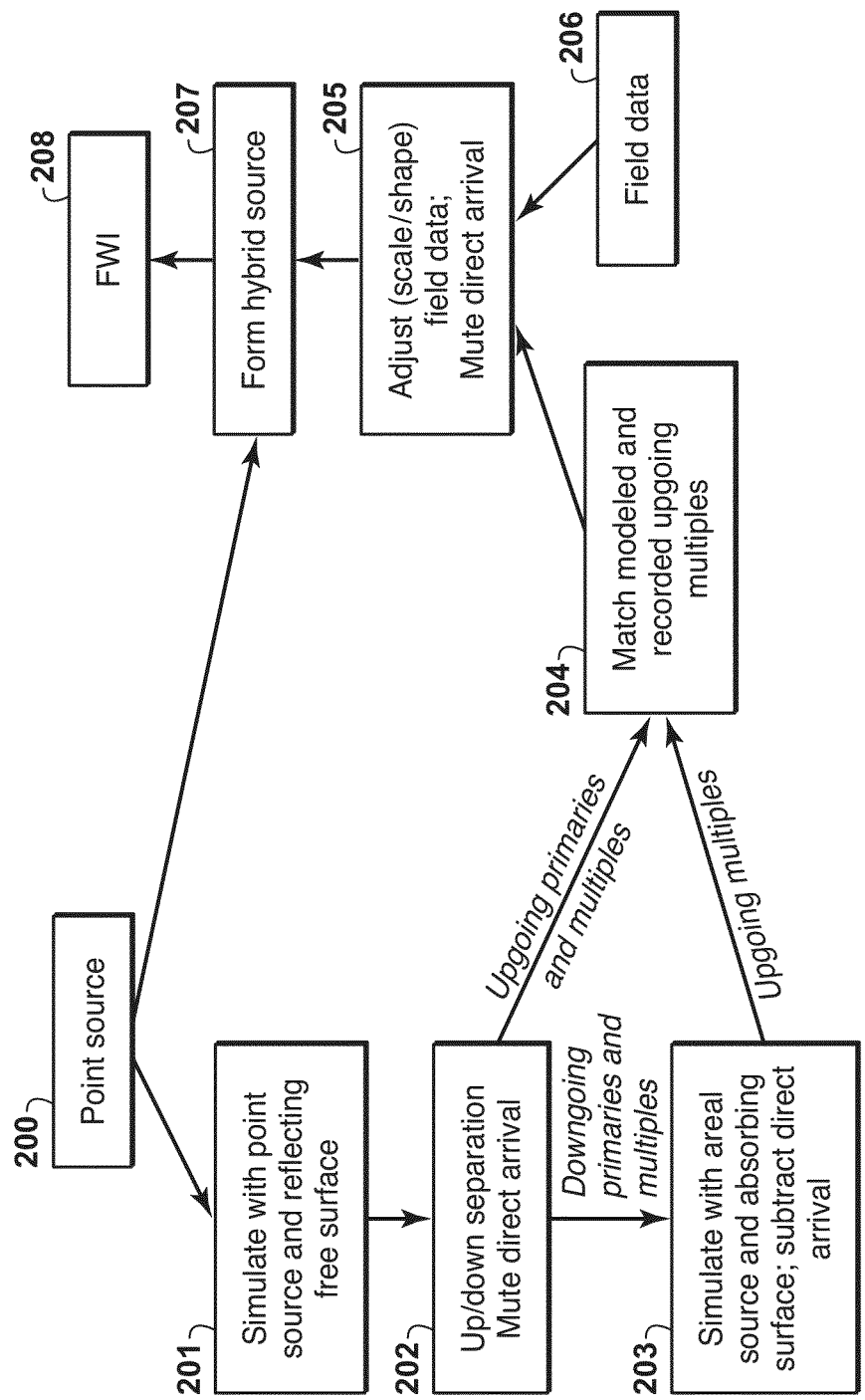
FIG. 2 is an exemplary flow chart illustrating an embodiment of the present technological advancement.

The use of the hybrid source poses unique challenges in FWI. Since FWI relies on accurate modeling of amplitudes, the areal source and the balance between the point source and the areal source need to be chosen carefully. FIG. 2 provides an exemplary method of using a hybrid source in FWI.

In step 201, a first simulation is performed using a chosen point source 200 with a reflecting free surface boundary condition imposed. The point source 200 can be injected into the model as a monopole. The model used in the simulation should contain at least one reflector, so that multiples are generated.

In step 202, the up- and down-going wavefields are obtained by performing up/down separation or a simplified version of it. In step 202, the up-down separation of synthetic data should be compatible with the type of field data to be used in inversion. Thus, if a multicomponent streamer was used in field acquisition, providing direct measurements of pressure and particle velocity (or, equivalently, pressure gradient), and the two components are used to perform the up/down wavefield separation, the same type of receiver and the same separation method should be used in synthetic simulations. If, on the other hand, conventional single-component data are acquired in the field, one could approximate the up-going wavefield by setting it equal to the acquired field data and the down-going wavefield by setting it equal to the acquired field data multiplied by "−1" (to account for the reflection coefficient of the air-water interface.) Other approximate up/down separation techniques, e.g., deghosting, can be used as well.

In step 203, a second simulation is performed using an areal source (including the down-going wavefield obtained in step 202) and an absorbing boundary condition to generate up-going multiples. The second simulation can use the same model as in the first simulation. In step 203, the direct arrival (i.e., the energy propagating in the water directly from the source to the receiver) needs to be muted before the areal source is injected. The reason is that injecting the direct arrival will generate a copy of the primaries (perhaps with an incorrect phase and amplitude, depending on implementation), thus duplicating the arrivals coming from the dipole source included in the hybrid source.

In step 204, the up-going multiples generated in step 203 are adjusted (e.g., filtered or scaled) to match their counterpart in step 202. By match, ideally this can encompass equal, but more generally it refers to minimizing a misfit between the two in some norm (e.g., L2). In step 204, the simulated wavefield from step 203 can contain both the up-going multiples and the direct arrival from the areal source. This direct arrival needs to be subtracted off as it is not present in field data. Thus, an additional simulation, using a model comprising the water layer only (for marine data, whereas land data would go through a near surface model), can be performed and its result subtracted.

In step 205, the adjustment (e.g., shaping filter or a scaling coefficient) derived in step 204 is applied to the areal source (the down-going field data 206) and the direct arrival is muted or subtracted. Examples of shaping filters or scaling coefficients can be found in Robinson, E. A., and Treitel, S., 1908, Geophysical signal analysis, Prentice-Hall, Inc.

Furthermore, the up-going multiples modeled in step 204 may not represent a good match for multiples observed in field data due to errors in modeling (e.g., incorrect position of the water bottom in the model or insufficient sampling of field data which is used as an areal source). When simulated and observed multiples do not match well, inverted models may suffer from artifacts, which typically manifest themselves as false events in the model. In this case, an adjustment (e.g., a shaping filter) can be designed to improve the match between modeled and observed multiples. This adjustment can then be applied to the down-going wavefield used as the areal source. The ability to adjust the point and areal sources independently is an additional degree of flexibility allowed by the use of a hybrid source, not present in conventional FWI, where both primaries and multiples are generated by the same point source. If the adjustment (e.g., shaping filter) is spatially varying, then the shaping process can be repeated iteratively until the adjustment becomes an identity operator (e.g., shaping filters become band-limited delta-functions.) However, the shaping filter does not necessarily become an identity operator; rather the shaping filter can be adjusted to converge toward the identity operator through a predetermined number of iterations or another stopping condition is reached. If the filter is spatially invariant, then only a single iteration is required due to the linearity of the wave equation with respect to time-domain shaping.

In step 207, a hybrid source is formed by combining the point source 200 with the adjusted areal source from step 206. The point source is a seismic trace. The areal source is a collection of seismic traces. The hybrid source can be formed by concatenating the areal source and the point source into a single file or using an equivalent method, the net result being a simultaneous injection of both sources into the simulation.

In step 208, FWI is performed using the hybrid source and an absorbing boundary condition on the surface, with all other aspects being exactly the same as in the traditional approach of FWI. An objective function can be used to measure a misfit between modeled up-going wavefields and recorded up-going wavefields, which generates an updated subsurface physical property model. While this example applies an absorbing boundary condition, a free surface condition could be used. However, the free surface condition may be more sensitive to the velocity errors because of the extra multiples.

Examples

The present technological advancement is further illustrated with an example based on a simple layered velocity model. FIG. 3A illustrates an exemplary velocity model with alternating high and low velocity layers. FIG. 3B illustrates a difference between the starting velocity model (not shown) and the true velocity model (FIG. 3A), which is equal to 20 m/s everywhere.

Accordingly, the FWI update direction is expected to indicate a velocity increase everywhere in the subsurface. A numerical experiment is performed using a single shot record with the source location approximately in the middle of the model (just below the free surface) and receivers extending both to the left and right of the source location up to 12 km away. The conventional approach produces an update direction (negative gradient), which indicates the desired velocity increase only in the vicinity of the source location (FIG. 4A). In contrast, the present technological advancement results in an update direction which has the correct sign almost everywhere (FIG. 4B).

Non-Hybrid Areal Source

Yet another alternative is to replace the hybrid source with an areal source without muting out direct arrivals by using the fact that direct arrivals will be converted into primaries after propagating through the medium one more time. As discussed previously, primaries will be converted into first-order multiples, first-order multiples will be converted into second-order multiples, etc. Therefore, if the medium is the true medium, the data, after propagating it one more time, will be "equivalent" to the data itself. This can be formally proved by using the representation theory by assuming infinite acquisition aperture and injecting both pressure and vertical velocity data (Amundsen and Robertsson, 2014). In practice, however, this is not likely to happen, because seismic acquisition is always limited in nature; and for streamer data, often only pressure data is recorded. However, it can be shown numerically that, by injecting only pressure data, we still preserve the travel time, although the amplitudes might not be accurate anymore. If the purpose is only to use the travel time information from the data to improve the velocity model, this modeling strategy can still be useful, especially when considering that it is less prone to cycle-skipping.

Figure 5C:
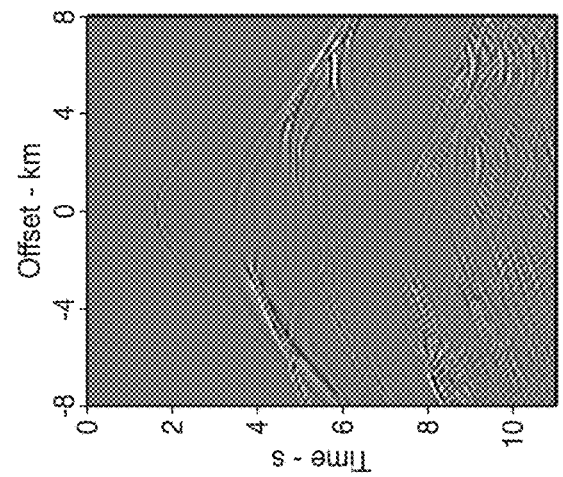
FIG. 5C illustrates an exemplary propagation of the data in FIG. 3A through a different velocity model.
Figure 5B:
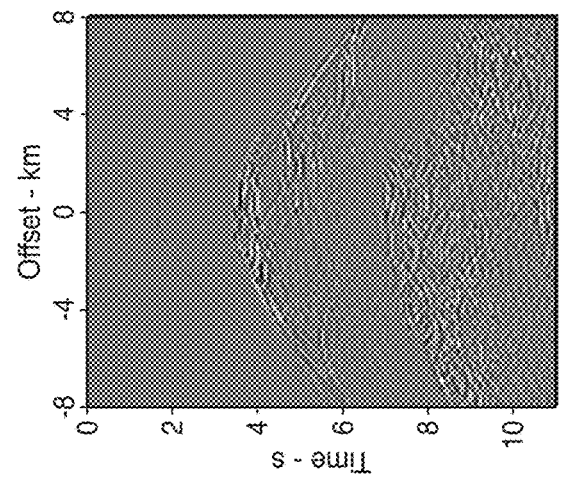
FIG. 5B illustrates an exemplary propagation of recorded data (i.e., FIG. 3A) through the same velocity model.
Figure 5A:
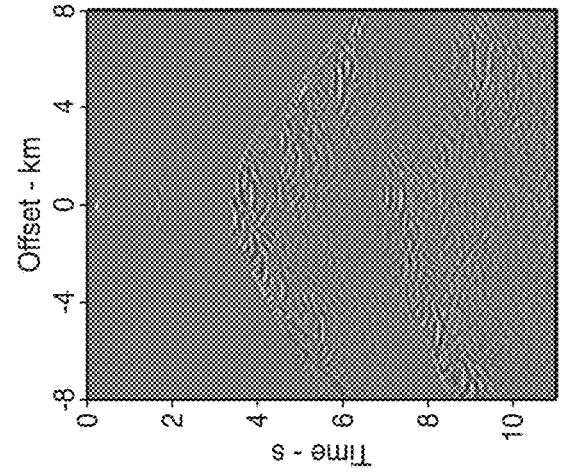
FIG. 5A illustrates an exemplary propagation of a point source through a velocity model.

FIG. 5A shows simulated data obtained by propagating a point source through a velocity model, while FIG. 5B shows the simulated data when using the shot gather shown in FIG. 4A as the source and propagating it one more time through the same velocity model. Note that the travel time information has been properly preserved. FIG. 5C shows the simulated data when propagating the recorded data (FIG. 5A) through a different velocity model (one can think of it as an initial model for FWI). FIG. 5C is massively different from FIG. 5B or FIG. 5A because a different model, instead of the true model, was used for propagation. The difference between (b) and (c) shows the velocity sensitivity of such a modeling strategy, and the difference can be used in the FWI process to update the velocity model so that FIG. 5C can be closer to FIG. 5A or 5B. During areal-source FWI, the simulated data using the areal source on the initial model (e.g. FIG. 5C) will be used to compare with the observed data (e.g. FIG. 5A). The difference between the two is referred to as a residual, and the residual can be converted into a model update such that once the model is updated, the difference (or residual) between the simulated and observed data will decrease. If convergence has been achieved, the difference between the simulated data using an areal source on the final inverted model (e.g. FIG. 5B) and the observed data (e.g. FIG. 5A) will achieve a minimum.

FIGS. 6A, 6B, 7A, 7B, and 7C present a numerical example of the non-hybrid areal source method. FIG. 6A illustrates a true velocity model for a 2D synthetic examples, and FIG. 6B illustrates an example of the initial velocity model for FWI.

FIG. 7A illustrates the resulting model from conventional FWI using a point source as the source function. FIG. 7B illustrates the resulting model from FWI using the observed data as the source function. FIG. 7C illustrates the resulting model through a two-stage FWI process, wherein stage one includes running FWI using the observed data as the source function, and stage two includes running FWI using a point source as the source function with the stage one inverted model as the starting model.

While conventional FWI (FIG. 7A) struggles to recover the rugose top of salt due to the negative impact of surface related multiples, the areal source FWI (FIGS. 7B and 7C) does a much better job in delineating the top of salt.

Figure 8:
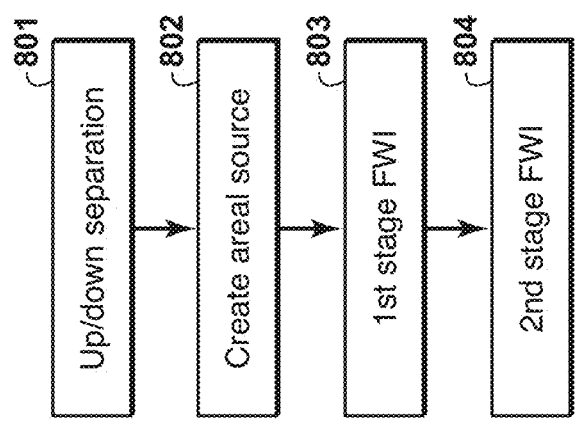
FIG. 8 is an exemplary flow chart illustrating an embodiment of the present technological advancement.

FIG. 8 illustrates a method of using a multi-stage FWI process with a non-hybrid areal source. Step 801 includes performing up/down separation of seismic data, which produces an approximate up-going wavefield and an approximate down-going wavefield. Step 802 includes creating an areal source based at least in part on the down-going wavefield. Steps 803 and 804 constitute a multi-stage full wavefield inversion process. The first stage step 803 can include running full wavefield inversion using observed data (i.e., down going field data) as a source function to obtain an intermediate subsurface physical property model, and the second stage 804 can include running full wavefield inversion using a point source as a source function with the intermediate subsurface physical property model being inverted to create a starting model for the second stage.

Hydrocarbons can be managed according to the output subsurface model generated by the methods of FIGS. 2 and 8. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

While the exemplary embodiments discussed here pertain to marine data, the present technological advancement is applicable to land data.

In all practical applications, the present technological advancement must be used in conjunction with a computer, programmed in accordance with the disclosures herein. Any step in any of the methods discussed herein can be implemented with a computer. Preferably, in order to efficiently perform FWI, the computer is a high performance computer (HPC), known as to those skilled in the art, Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

References

The following references are hereby incorporated by reference in their entirety:

Amundsen, L. and J. O. A. Robertsson, Wave equation processing using finite-difference propagators, Part 1: Wavefield dissection and imaging of marine multicomponent seismic data, Geophysics 79(6), 2014, pp. T287-T300;

Tu, N. and Herrmann, F. J., Fast Imaging with surface-related multiples by sparse inversion, Geophysical Journal International (2015) 201, 304-31; and Zhang, D., W, Dai, and G. T. Schuster, Multiples Waveform inversion, 75th EAGE Annual Meeting, 2013.

What is claimed is:

1. A method, comprising:
  performing, with a computer, up/down separation of geophysical data, which produces an approximate up-going wavefield and an approximate down-going wavefield;
  creating a hybrid areal source based at least in part on the down-going wavefield; and
  performing, with a computer, a full wavefield inversion process with the hybrid areal source, and an objective function measuring a misfit between modeled up-going wavefields and recorded up-going wavefields, wherein the full wavefield inversion process generates a final subsurface physical property model for hydrocarbon exploration.

2. The method of claim 1, wherein the creating the hybrid areal source comprises:
  performing, with a computer, a first simulation using a point source injected as a monopole into a starting physical property model with at least one subsurface reflector and a free surface boundary condition imposed,
  wherein the performing the up/down separation is performed on data generated from the first simulation;

performing, with a computer, a second simulation using the point source, but with the point source injected into the starting physical property model as a dipole with an absorbing boundary condition;

performing, with a computer, a third simulation using an areal source including a down-going wavefield obtained from the up/down separation, and an absorbing boundary condition;

adjusting simulated data from the third simulation and the second simulation to match their counterparts from the up/down separation; and applying an adjustment derived from the adjusting of the simulated data to the areal source and forming the hybrid areal source by concatenating the adjusted areal source and the point source.

3. The method of claim 2, wherein the adjusting includes using a shaping filter.

4. The method of claim 3, wherein the shaping filter is spatially varying, and the method further comprises iteratively repeating a shaping process, wherein the shaping filter is iteratively changed during each subsequent iteration so that the shaping filter converges towards an identity operator.

5. The method of claim 4, wherein the shaping filter is iteratively changed during each subsequent iteration in order to progressively improve the match between the simulated data from the third simulation and the second simulation and their counterparts from the up/down separation.

6. The method of claim 1, wherein the full wavefield inversion process is a two stage process, a first stage including running full wavefield inversion using observed data as a source function to obtain an intermediate subsurface physical property model, and a second stage including running full wavefield inversion using a point source as a source function with the intermediate subsurface physical property model being inverted to create a starting model for the second stage.

7. The method of claim 2, further comprising independently adjusting the areal source including the down-going wavefield relative to the point source.

8. The method of claim 2, wherein the performing the third simulation includes muting or subtracting a direct arrival before the areal source including the down-going wavefield is injected.

9. The method of claim 1, wherein the performing the wavefield inversion process includes using an absorbing boundary condition.

10. The method of claim 1, further comprising drilling a well based at a location determined at least in part from the final subsurface physical property model.

11. The method of claim 1, further comprising exploring for hydrocarbons using the final subsurface physical property model.

12. The method of claim 1, further comprising activating sources at or near Earth's surface or a water body surface, and recording reflected signals from the Earth's subsurface.

13. The method of claim 1, wherein the geophysical data is land data.

14. The method of claim 1, wherein the geophysical data is marine data.

15. The method of claim 2, wherein the method further comprises:

performing, with a computer, a fourth simulation using a model consisting of the water layer to determine a direct arrival from the areal source including the down-going wavefield; and subtracting the direct arrival from a simulated wavefield generated by the third simulation.

* * * * *